United States Patent Office 3,415,383
Patented Dec. 10, 1968

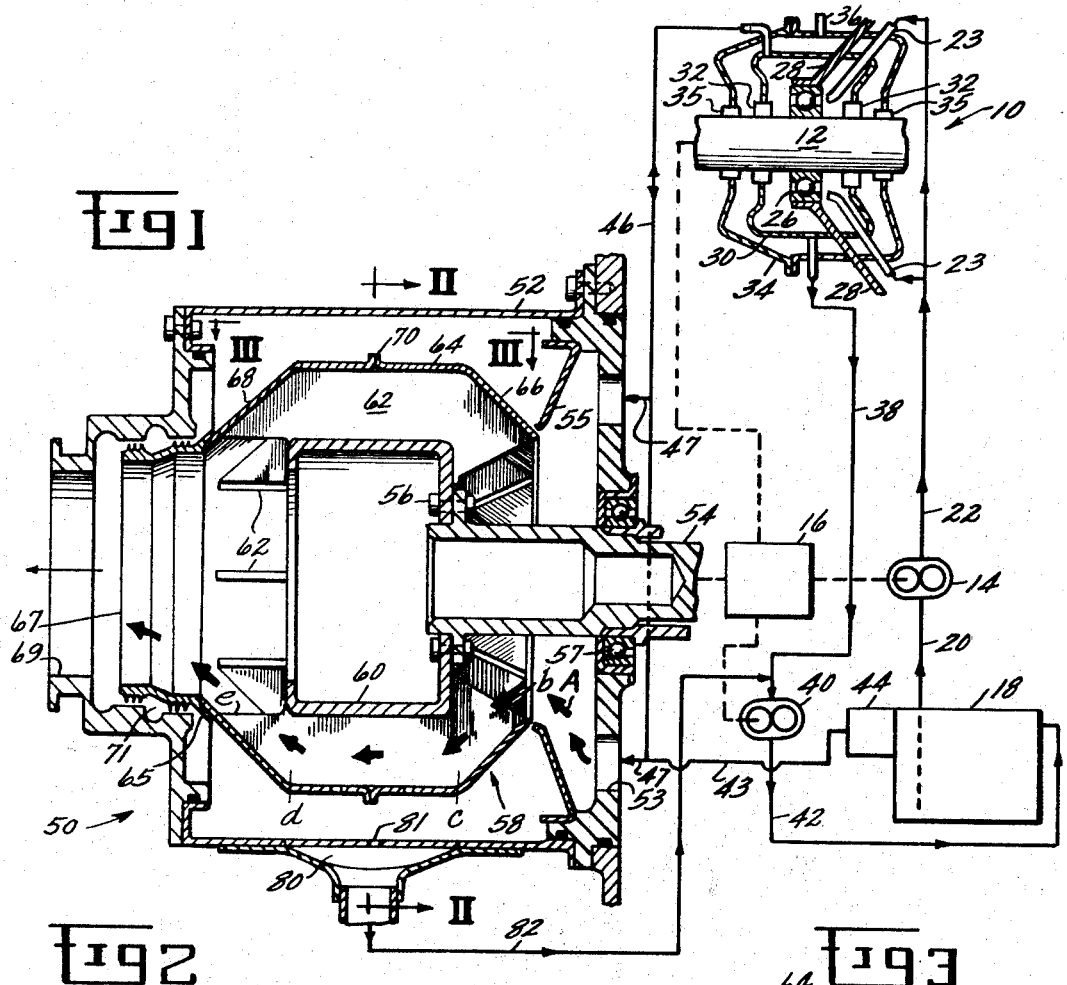

3,415,383
CENTRIFUGAL SEPARATOR
Roger T. Earle, Jr., and Nathan E. Davis, Jr., Cincinnati, Ohio, assignors to General Electric Company, a corporation of New York
Filed Feb. 23, 1966, Ser. No. 529,317
5 Claims. (Cl. 210—377)

ABSTRACT OF THE DISCLOSURE

A separator having a rotatable separator element disposed in a housing and forming an annular passage which is segmented by a plurality of radially extending blades and formed with a divergent inlet communicating with the housing inlet and a convergent outlet communicating with the housing outlet. The leading edge of each blade is disposed within the divergent inlet and extends radially inwardly of the trailing edge of each blade. The outer wall of the separator element is formed with apertures intermediate the divergent inlet and convergent out for removal of denser material centrifuged from a fluid flowing through the separator element passage. The housing is adapted to collect the denser material centrifuged from the separator element.

---

The present invention relates to improvements in separators of the type that remove denser material from flowing fluid and especially, although not necessarily, such separators which are adapted to remove oil from air vented in gas turbine lubrication systems.

The motivating environment for the present invention is in lubrication systems for gas tutrbine engines. In such systems pressurized oil is directed against shaft bearings which are mounted within a chamber having seals for preventing oil leakage along the shaft. A scavenge pump continuously draws oil from the lubrication chamber to prevent any build-up of oil therein. A positive air pressure on the outer ends of the shaft seals also aids in preventing oil leakage. This "sealing" air tends to pressurize the lubrication chamber making it desirable to vent the lubrication chamber to a lower pressure, usually atmosphere, in order to maintain an effective pressure differential across the shaft seals. The vent air thus discharged contains minute particles of oil, due to the turbulent conditions in the bearing compartment. Inasmuch as substantial quantities of air must often be vented from the lubrication system, loss of oil entrained therein poses a serious problem and may necessitate an unnecessarily large oil supply to provide adequate lubrication, which adds unwanted weight to an aircraft.

It has been proposed to pass such vent air through a separator of the centrifugal type to recover the oil from the air before it is passed to atmosphere, i.e., overboard where the engine is used for propulsion of an aircraft. Although previous separators have been effective in removing oil from vent air, they offer a substantial resistance to high flow. This resistance to flow causes an undesirable pressure build-up in the lubrication chamber which reduces the pressure differential across the seals below an acceptable level and also adversely affects operation of the usual type of scavenge pump.

It is accordingly a prime object of the present invention to provide an improved separator which effectively separates denser material from a flowing fluid while offering a negligible resistance to flow and is particularly adapted to overcome the above discussed problems of venting air in gas turbine lubrication systems.

It is further object of the present invention to minimize energy losses in such separators.

The above ends are attained by providing a separator for removing denser material from a flowing fluid which includes a rotatable separator element comprising a shell having converging conical portions at opposite inlet and outlet ends and a hub defining in combination with said shell an annular flow path angled outwardly from the inlet end and inwardly toward said outlet end. The separator element further comprises means at the entrance end for tangentially accelerating fluid introduced therein. The shell is apertured for discharge therefrom of denser material from said fluid mixture by centrifugal force resulting from this tangential acceleration. A housing surrounds said shell and captures the denser material so discharged. The separator element has further means for tangentially decelerating fluid discharged therefrom to a tangential velocity approximating the initial tangential velocity at said inlet end, which relationship has been found effective in minimizing resistance to fluid flow through said separator from the entrance to the exit with a minimum energy loss in the operation of the separator.

The above and other related objects and features of the invention will be apparent from a reading of the following description of the disclosure found in the accompanying drawing and the novelty thereof pointed out in the appended claims.

In the drawing:
FIGURE 1 is a longitudinal section of a separator embodying the present invention with the cooperating elements of a gas turbine lubrication system shown in abbreviated diagrammatic fashion;
FIGURE 2 is a view taken on line II—II of FIGURE 1; and
FIGURE 3 is a fragmentary view taken on line III—III of FIGURE. 1.

FIGURE 1 shows diagrammatically those portions of a lubrication system for a gas turbine engine (not shown) which are pertinent to the present invention. The lubrication system supplies a series of bearing assemblies 10 (only one of which is shown) in which a main shaft 12 of the gas turbine engine is rotatably journaled.

The lubrication system comprises a supply pump 14 driven from the main shaft 12 through suitable mechanical connections, including a gear box 16. The pump 14 receives lubricating oil from a tank 18 by way of a conduit 20 and delivers pressurized oil to the bearing assembly 10 through a conduit 22.

Conduit 22 delivers oil to nozzles 23 which direct the oil against a bearing 26, the outer race of which is mounted on a suitable fixed support 28. The bearing assembly 10 may take various forms and the showing herein is highly simplified.

The oil discharged from nozzles 23 is then collected in an annular sump 30 also mounted on support 28 and having a pair of seals 32 which surround the main shaft 12. To prevent leakage of oil across the seals 32, the sump housing 30 is surrounded by an annular housing 34, having contained therein air under pressure which may be conveniently derived from the engine compressor through a line 36 to maintain the housing 34 at a presssure higher than that in sump 30. Appropriate seals 35 are provided between the stationary housing 34 and the rotating shaft 12.

Oil is pumped from sump 30 to the tank 18 through a pair of conduits 38, 42 by a positive displacement return or scavening pump 40. To prevent the oil in sump 30 from flooding the seals 32, particularly when the gas turbine engine is in an aircraft executing a steep climb or dive, the capacity of return pump 40 is substantially greater than the capacity of the supply pump 14. As a result air is also pumped from sump 30 to the tank 18 which tends to lower the pressure in sump 30 below the point at which pump 40 will efficiently function, and increases the pressure in tank 18 to an adverse level.

Normally a small amount of air from housing 34 passes by the seals 32 into sump 30, but such flow is insufficient to raise the pressure in sump 30 to an acceptable level. In order to limit the pressure in tank 18 and maintain the sump 30 at a pressure above the minimum for efficient operation of return pump 40, a pressure relief valve 44 is provided which vents the excess pressure in tank 18 to the sump 30 by means of conduits 43, 46. So connected, the sump 30 will be pressurized by the flow from tank 18 and the flow across the seals 32. To prevent the pressure in sump 30 from increasing to a point at which the pressure differential across the seals 32 in insufficient to prevent leakage of oil thereacross, a conduit 47 is connected to conduits 43, 46 to carry away the excess pressure to a suitable discharge. In some gas turbine engines, it is desirable to maintain the sump 30 at atmospheric pressure, which may be provided by connecting the conduit 47 with means offering negligible resistance to flow and providing a path to the atmosphere.

In normal operation there will generally be a flow of air to the atmosphere. This air contains minute droplets of oil which are suspended therein by the turbulent conditions in the sump 30 and the violent mixing of air and oil in the return pump 40. When a seal malfunctions or begins to wear, appreciable quantities of the air/oil mixture will eventually pass to the atmosphere. It is apparent that the loss of oil to the vent discharge may be excessive, which may be a serious problem when a gas turbine engine is used for aircraft propulsion.

To eliminate these oil losses, in accordance with the present invention, an air/oil separator 50 is provided to separate the oil from the air which passes through conduits 47 before being vented to the atmosphere. The oil so separated is returned to the lubrication system. The separator 50 further offers a negligible resistance to widely varying flows therethrough and has minimum energy losses in performing the separating function.

The air/oil separator 50, shown in FIGURES 1 and 2, comprises a generally cylindrical housing 52 having a series of entrance ports 53 which connect with the conduit 47 through suitable means. A baffle 55 extends inwardly from the housing 52 to a bladed shell 58 and mating with the entrance thereof. The bladed shell 58 comprises a hollow shaft 54, journaled in housing 52 by means of a bearing 57 and mechanically driven by the gear box 16. The shaft 54 has attached thereto by means of a series of bolts 56 a hub 60 which has extending therefrom a plurality of blades 62. The blades 62 are suitably attached at their outer edges to a generally cylindrical intermediate shell 64 having converging conical inlet and outlet portions 66, 68. Extending from the outlet portion 68 is a generally cylindrical discharge tube 65 having a further reduced outlet diameter 67 which provides a path to the atmosphere through a port 69 of the housing 52 and suitable conduit means (not shown). A suitable seal 71 which may be of the labyrinth type is provided between housing 52 and the shell 64. The bladed shell 58 may conveniently be comprised of two sections suitably attached at 70. The cylindrical intermediate shell 64 is apertured by means of a plurality of holes 72, 74 shown in detail in FIGURE 3 which provide communication of the interior of the bladed shell 58 with the interior of housing 52. The holes 72 are adjacent and on opposite sides of each blade 62 at either end of the cylindrical intermediate shell 64. The holes 74 are midway between adjacent blades 62.

The housing 52 has a series of ports 76, 78 formed by raised tabs 77, 79 and holes 81 which provide a path to a scroll chamber 80. The chamber 80 has extending therefrom a conduit 82 which connects with the conduit 38 near the suction side of return pump 40.

Referring primarily to FIGURE 1, operation of the air/oil separator 50 will now be described. By virtue of the fact that the pressure in conduit 47 is greater than that of the atmosphere, fluid from conduit 47 follows a path through the separator 50 to the atmosphere nominally depicted by line A.

The means which direct the flow along this path define an area transverse to the flow at all points sufficiently large to offer a negligible resistance to flow which is especially advantageous when high flow rates are encountered. Furthermore, the converging conical inlet and outlet portions 66, 68 of the shell 64 provide smooth directional changes in the flow path which minimize resistance to flow due to energy losses. The engine-driven shaft 54 and bladed shell 58 are at all times rotating at a speed sufficiently high to effect a separation in the following fashion.

The air/oil mixture enters the separator through ports 53, which are disposed as near the axis of rotation of the bladed shell 58 as manufacturing considerations will permit. As illustrated, the bearing 57 and its necessary support structure necessitate introduction of the air/oil mixture through the housing 52 radially outward from the axis of the bladed shell 58 so a baffle 55 is provided to direct the mixture inward for generally outward entry into the conical inlet portion 66 of the bladed shell 58 near its axis of rotation. At this point the edges $b$ of the blades 62 impart to the mixture a relatively low initial tangential velocity to minimize resistance due to energy losses that accompany a sudden change in direction and velocity.

The air/oil mixture is then accelerated tangentially as it is forced outwardly by centrifugal force which lowers the pressure on the edges $b$ of the rotating blades 62. This lowering of pressure provides entry with a negligible resistance because the mixture is, in effect, forced into the bladed shell 58 by the higher pressure upstream of the inlet thereof. It should be noted that the edges $b$ of the blades 62 are disposed generally transverse to the flow path A to provide uniform pumping of the mixture by the blades 62 across their edges $b$.

The air/oil mixture is then accelerated to a maximum tangential velocity as it flows essentially radially in the compartments defined by blades 62 and the conical inlet portion 66 of the bladed shell 58. These compartments provide realization of maximum tangential velocities within a minimum radial distance because they constrain the mixture to rotate at nearly the maximum tangential velocity of the blades 62.

To insure that all the constituents of the mixture, which is in a sense a compressible gas, reach their maximum tangential velocities, the mixture is allowed to flow axially parallel for a predetermined distance in the compartments defined by the blades 62 and the cylindrical intermediate shell 64c, d. This distance determines the time for which the mixture is maintained at the maximum tangential velocity and the distance is selected by relating the maximum anticipated flow through the separator 50 to the rotational speed of the bladed shell 58 and the maximum radial dimensions of the blades 62.

As the tangential velocity of the air/oil mixture increases to its maximum value, the oil, which has a greater density than air, is forced against the interior of the cylindrical intermediate shell 64 by centrifugal force. The oil, and some air, passes through holes 72, 74 where it is collected by the tabs 77, 79 and passed through ports 76, 78 and also holes 81 to the scroll chamber 80 and returned to the lubricating system through conduit 82. To reduce the passage of air through holes 72, 74 and optimize the separation of oil from the main flow of air, holes 72, 74 are located at points where the oil would tend to collect on the shell 64.

The separation of oil from the stream of air takes place as the mixture travels axially in the bladed shell 64 and when it passes point $d$, the air is substantially purified. The air then passes inwardly through the compartments defined by blades 62 and the converging conical outlet portion 68 of the bladed shell 58. As the air flows inwardly its tangential velocity is decelerated to the point where it exits from the blades 62 at $e$, at which point its velocity is substantially equal to the tangential velocity at the inlet end of the blades 62. The air then follows a path through generally cylindrical discharge tube 65 which has a negligible resistance to flow and exits through hole 67 and port 69 to be discharged to the atmosphere. It will be noted that edge $b$ is slightly closer to the axis of rotation than edge $e$. As shown in FIGURE 1, the edge $b$ joins the shell 64 radially outwardly of the junction between edge $b$ and the hub 60 while edge $e$ extends generally axially and is spaced from the axis of rotation of the separator element 58 by a distance approximating the radial distance from the axis of rotation of the separator element 58 to the point where edge $b$ joins the shell 64. This is done to compensate for the relatively low acceleration losses as the stream is directed through the separator 50 so that it will act as neither a pump nor a resistance to flow.

While tangentially decelerating the air, the converging conical outlet portion 68 of the bladed shell 58 serves the additional purpose of preventing any oil which has not exited through the holes 72, 74 from passing to the port 69. It can be seen that centrifugal force tends to force oil outwardly along the conical outlet portion 68 where it may pass through holes 72.

Oil is further prevented from passing to the port 69 by the seal 71 which retains the separated oil in the housing 52.

The air/oil separator thus described effectively separates oil from a stream of flowing air while offering a negligible resistance to flow and having low energy losses. This feature is of particular advantage in lubrication systems having a vent discharge system from a bearing sump maintained at a relatively constant pressure with flows from the system varying from a low to a relatively large rate.

Furthermore, the present invention is not limited to use in a lubrication system but may be used in any flow system where a denser material is to be removed from a stream of flowing fluid while offering a negligible resistance to widely varying flow rates.

Other modifications will occur to those skilled in the art and the scope of the invention is to be derived solely from the following claims.

Having thus described the invention, what is claimed as novel and desired to be secured by Letters Patent of the United States is:

1. A separator for removing denser material from a flowing fluid including, in combination:
   a rotatable separator element comprising,
      a shell having converging conical portions at opposite inlet and outlet ends, a cylindrical portion intermediate said inlet end and said outlet end, and a hub defining in combination with said shell an annular fluid flow path angled outwardly from said inlet end and inwardly toward said outlet end and an axial flow path intermediate said angled flow paths of sufficient length to accelerate said fluid to and maintain it at a maximum tangential velocity for a period of time sufficient to centrifuge substantially all denser material therefrom, and
      a plurality of blades for tangentially accelerating and decelerating said fluid, each said blade extending from one end of the shell to the other and having a leading edge between said hub and said shell at the inlet end of said separator element and a trailing edge between said hub and said shell at the outlet end of said separator, with said leading edges of said blades disposed substantially transversely to the flow of fluid thereacross,
   said cylindrical intermediate portion of said shell formed with a pair of apertures adjacent each side of each said blade and a pair of apertures substantially midway between adjacent blades to enable discharge of denser material centrifuged from said fluid;
   a housing enclosing said separator element for capturing the denser material discharged therefrom, said housing formed with a plurality of ports radially outwardly of said separator element inlet; and
   means for directing said fluid from said ports into the inlet of said separator element.

2. The separator of claim 1 wherein said means for directing said fluid into the inlet comprise a baffle between said ports and said separator element and defining a central opening mating with the inlet of said separator element, said baffle extending radially outwardly of said ports.

3. A separator for removing denser material from a flowing fluid, said separator comprising:
   a housing having an inlet and an outlet;
   a rotatable separator element disposed in said housing and forming an annular passage having inner and outer walls, a divergent inlet, and a convergent outlet;
   means for directing said fluid from said housing inlet to said divergent inlet and from said convergent outlet to said housing outlet;
   said separator element passage being compartmentalized between said divergent inlet and said convergent outlet by a plurality of blades extending between said inner and outer passage walls;
   each said blade having a leading edge disposed within said divergent inlet and a trailing edge disposed within said convergent outlet, with said leading edge joining said outer passage wall radially outwardly of the junction between said leading edge and said inner passage wall and said trailing edge extending substantially axially and being spaced radially from the axis of rotation of said separator element by a distance approximating the radial distance between the axis of rotation and the junction of said leading edge and said passage outer wall, to thereby minimuze resistance to fluid flow through said separator element passage and minimize energy losses in the operation of said separator; with
   said separator element outer passage wall formed with a plurality of apertures for removal of denser material centrifuged from said fluid during flow from said housing inlet to said housing outlet.

4. The separator of claim 3 further characterized in that said annular passage is formed with an axial portion intermediate said divergent inlet and said convergent outlet, the length of said axial portion being sufficient to accelerate said fluid to and maintain it at a maximum tangential velocity for a period of time sufficient to discharge substantially all denser material therefrom.

5. The separator of claim 4 further characterized in that said apertures are formed along said intermediate axial portion and comprise a pair of apertures adjacent each side of each said blade and a pair of apertures substantially midway between adjacent blades.

References Cited
UNITED STATES PATENTS

| 978,450 | 12/1910 | Homans | 210—360 |
| 1,303,207 | 5/1919 | Kelly et al. | 55—408 X |
| 2,435,665 | 2/1948 | Woolaver | 210—381 X |
| 3,276,679 | 10/1966 | Booth | 55—407 X |

REUBEN FRIEDMAN, *Primary Examiner.*

J. L. De CESARE, *Assistant Examiner.*

U.S. Cl. X.R.

55—408; 210—168, 381